United States Patent
Veeningen (10) Patent No.: US 11,818,255 B2
(45) Date of Patent: Nov. 14, 2023

(54) BATCH-WISE VERIFICATION OF MULTIPARTY COMPUTATIONS

(71) Applicant: KONINKLIJKE PHILIPS N.V., Eindhoven (NL)

(72) Inventor: Meilof Geert Veeningen, Eindhoven (NL)

(73) Assignee: Koninklijke Philips N.V., Eindhoven (NL)

( * ) Notice: Subject to any disclaimer, the term of this patent is extended or adjusted under 35 U.S.C. 154(b) by 72 days.

(21) Appl. No.: 16/977,613

(22) PCT Filed: Mar. 11, 2019

(86) PCT No.: PCT/EP2019/055992
§ 371 (c)(1),
(2) Date: Sep. 2, 2020

(87) PCT Pub. No.: WO2019/170908
PCT Pub. Date: Sep. 12, 2019

(65) Prior Publication Data
US 2020/0396063 A1    Dec. 17, 2020

Related U.S. Application Data

(60) Provisional application No. 62/640,899, filed on Mar. 9, 2018.

(51) Int. Cl.
*H04L 9/08* (2006.01)
*G06F 17/17* (2006.01)
*H04L 9/32* (2006.01)

(52) U.S. Cl.
CPC .............. *H04L 9/085* (2013.01); *G06F 17/17* (2013.01); *H04L 9/0869* (2013.01); *H04L 9/3242* (2013.01); *H04L 2209/08* (2013.01); *H04L 2209/46* (2013.01)

(58) Field of Classification Search
None
See application file for complete search history.

(56) References Cited

U.S. PATENT DOCUMENTS 9,449,177 B1 * 9/2016 El Defrawy ............ G06F 21/60
9,536,114 B1 * 1/2017 El Defrawy ............ H04L 63/04
10,083,310 B1 * 9/2018 Lampkins ............. H04L 9/3093

OTHER PUBLICATIONS

Zuzana Beerliov'a-Trub'iniov'a, Efficient Multi-Party Computation with Information-Theoretic Security, 2008 (Year: 2008).*
Eli Ben-Sasson, Serge Fehr, Rafail Ostrovesky—Near-Linear Unconditionally-Secure Multiparty Computation with a Dishonest Minority (Year: 2012).*

(Continued)

*Primary Examiner* — Michael W Chao
*Assistant Examiner* — Shadi H Kobrosli (57) ABSTRACT

Some embodiments are directed to a computation device configured for batch-wise multiparty verification of a computation which has been performed multiple times. The computations being multiparty computations that are cryptographically shared between the computation device and multiple other computation devices. The computation device is configured to perform the computation a further time to obtain a randomizing computation on a randomizing set of values.

15 Claims, 6 Drawing Sheets

(56) References Cited

OTHER PUBLICATIONS

Lindell, Yehuda; Nof, Ariel; "A Framework for Constructing Fast MPC over Arithmetic Circuits with Malicious Adversaries and an Honest-Majority"; 2017; CCS'17; 259-276 (Year: 2017).*
Damgard, Ivan; Nieslen, Jesper; "Scalable and Unconditionally Secure Multiparty Computation"; 2007 (Year: 2007).*
Ben-Sasson, et al., "Near-Linear Unconditionally-Secure Multiparty Computation with a Dishonest Minority", Aug. 19, 2012, Image Analysis and Recognition, 11th International Conference, ICIAR 2014, Vilamoura, Portugal, Oct. 22-24, 2014, Proceedings, Part I: In: Lecture Notes in Computer Science, vol. 8814, pp. 663-680.
International Search Report and Written Opinion for International Application No. PCT/EP2019/055992, filed Mar. 11, 2019, 14 pages.

\* cited by examiner

BATCH-WISE VERIFICATION OF MULTIPARTY COMPUTATIONS

RELATED APPLICATIONS

This application is the U.S. National Phase application under 35 U.S.C. § 371 of International Application No. PCT/EP2019/055992, filed on Mar. 11, 2019, which claims priority to and the benefit of Provisional Application Ser. No. 62/640,899, filed Mar. 9, 2018. These applications are hereby incorporated by reference herein, for all purposes.

FIELD OF THE INVENTION

The invention relates to a computation device, a computation method and a computer readable medium.

BACKGROUND

Multi-party computation (MPC), also known as secure multi-party computation is a subfield of cryptography wherein multiple parties jointly compute a function over their inputs while keeping those inputs private.

For example, in an application of MPC each of the participants have private data; the participants wish to compute a function over the private data, without revealing any more of the private data than is needed. If the parties had access to a trusted party, this would be easy, since each party could send its information to the trusted party who computes the function without revealing anything else than the function result. In MPC the aim is to reach the same result without the use of a trusted party.

In recent years, increasingly efficient protocols for MPC have been proposed, and MPC is increasingly applied to real-world applications. Typical aims of MPC protocols are on the one hand confidentiality and on the other hand correctness. Confidentially ideally implies that no more information can be derived about other parties' private data than can be derived from one's own private data and the function result. For correctness the parties should be convinced that the computation was performed correctly.

For some forms of MPC these traits only hold passively, e.g., they are passively secure. Such protocols do not protect against an active attacker. It is desirable for both confidentiality and correctness that these properties continue to hold even if a portion of the parties is compromised.

Popular forms of multi-party computations are based on Shamir secret sharing as they give bandwidth-efficient ways of performing MPC over non-binary fields. However, Shamir secret sharing is only passively secure, e.g., it does not protect against an actively secure attacker. A passive adversary tries to learn as much as possible about the private data of the other parties, but does follow the MPC protocol correctly.

An example of large scale MPC computations is, e.g., secure linear programming applications based on Shamir, e.g., as described in "Design of large scale applications of secure multiparty computation: secure linear programming." by S. de Hoogh. These protocols are secure against a passive adversary. It would be desirable for this and other MPC application to improve the resistance against active adversaries, preferably without incurring a large overhead.

The paper "Preprocessing-Based Verification of Multiparty Protocols with Honest Majority" by Roman Jagomagis, et al., presents a generic method for turning passively secure protocols into protocols secure against covert attacks by adding offline preprocessing and post-execution verification phases. In the preprocessing phase, each party generates and shares a sufficient amount of verified multiplication triples that will be used later to assist that party's proof. In the post-execution phase, the verifiers repeat the computation of the prover in secret-shared manner, checking that they obtain the same messages that the prover sent out during execution. Protecting a passively secure multiplication protocol in this manner gives overhead factors of at least 20.

There is therefore a desire to strengthen MPC protocols against active adversaries.

SUMMARY OF THE INVENTION

To improve upon MPC devices a computation device as defined in the claims is proposed. A computation device according to an embodiment verifies multiple computations. Since computations are verified, it is likely that an attempt to tamper with a computation will be detected. Accordingly, the resistance against active attackers is increased. In particular, for the case of Shamir-based MPC it is believed that embodiments provide a very efficient protocol for 1-out-of-3 actively secure MPC over large fields.

In the computation device an additional random computation is added to the batch of calculations that are to be verified. As a result the interpolations are uniformly random, so they can be opened during the verification. This in turn allows the interpolations to be verified in the plain. This provides a significant improvement to the efficiency of the verifications, as no protocol is needed to do the verification on the interpolation. Without the randomizing calculation the interpolated polynomials may leak information on the computations.

In an embodiment, verification is done by interpolating polynomials for a numbers. The random number s may be selected randomly from the computation field $Z_p$ itself, rather than from an extension field, thus avoiding overhead incurred by calculating in an extension field. The computation field is the field from wherein the secret-shares are taken and in which computations on the secret-shares are performed. If no extension field is needed, this implies that the same field may be used as the field that was used to perform the initial MPC computations that produced the computations that need to be verified.

Embodiments may be applied in any setting that uses, e.g., arithmetic-circuit multi-party computation between three or more parties or multi-party computation in the outsourcing setting, e.g., wherein many inputters/outputters outsource the work to a few evaluators. Known efficient multi-party computation protocols in these settings which are in use today are in the 3-party setting and do not protect against active attacks. The main reason is that it was always believed that adding active security would incur a prohibitively large overhead. In particular, for the case of Shamir based MPC multiplication, overhead is reduced from at least a factor 20 to a factor of about 2 to strengthen the passively secure algorithm to actively secure.

The computation device is an electronic device. The computation device may be a mobile electronic device, e.g., a mobile phone, tablet, etc. The computation device may be a computer, e.g., a set-top box, server, etc.

The computation method described herein may be applied in a wide range of practical applications. Such practical applications include: executing programs on confidential data while ensuring that no other sensitive information from the data is leaked.

A further aspect of the invention is a computation method. An embodiment of the method may be implemented on a computer as a computer implemented method, or in dedicated hardware, or in a combination of both. Executable code for an embodiment of the method may be stored on a computer program product. Examples of computer program products include memory devices, optical storage devices, integrated circuits, servers, online software, etc. Preferably, the computer program product comprises non-transitory program code stored on a computer readable medium for performing an embodiment of the method when said program product is executed on a computer.

In an embodiment, the computer program comprises computer program code adapted to perform all the steps of an embodiment of the method when the computer program is run on a computer. Preferably, the computer program is embodied on a computer readable medium.

Another aspect of the invention provides a method of making the computer program available for downloading. This aspect is used when the computer program is uploaded into, e.g., Apple's App Store, Google's Play Store, or Microsoft's Windows Store, and when the computer program is available for downloading from such a store.

BRIEF DESCRIPTION OF THE DRAWINGS

Further details, aspects, and embodiments of the invention will be described, by way of example only, with reference to the drawings. Elements in the figures are illustrated for simplicity and clarity and have not necessarily been drawn to scale. In the Figures, elements which correspond to elements already described may have the same reference numerals. In the drawings, FIG. 1a schematically shows an example of an embodiment of a multiparty computation system, FIG. 1b schematically shows an example of an embodiment of a multiparty computation system, FIG. 1c schematically shows an example of an embodiment of a computation device, FIG. 1d schematically shows an example of an embodiment of a computation device, FIG. 2a schematically shows an example of an embodiment of a method of opening a value, FIG. 2b schematically shows an example of an embodiment of a method of opening a value, FIG. 3 schematically shows an example of an embodiment of a computation method, FIG. 4a schematically shows a computer readable medium having a writable part comprising a computer program according to an embodiment, FIG. 4b schematically shows a representation of a processor system according to an embodiment.

LIST OF REFERENCE NUMERALS IN FIGS. 1a-1d, 2a, 2b, 7a, 7b 100 a multiparty computation system
110-112 a computation device
113 a multiparty computation system
150 a digital network
120 a communication interface
130 a memory
131 a processor
132 shares of values
140 a multiparty computation unit
142 a computation unit
144 a random number unit
146 a check unit
147 an interpolation unit
148 an open unit
210 a share of a value
220 a share of a value
230 a share of a value
221,231 information
241 a first key
242 a second key
243 a third key
243
1000 a computer readable medium
1010 a writable part
1020 a computer program
1110 integrated circuit(s)
1120 a processing unit
1122 a memory
1124 a dedicated integrated circuit
1126 a communication element
1130 an interconnect
1140 a processor system

DETAILED DESCRIPTION OF THE EMBODIMENTS

While this invention is susceptible of embodiment in many different forms, there are shown in the drawings and will herein be described in detail one or more specific embodiments, with the understanding that the present disclosure is to be considered as exemplary of the principles of the invention and not intended to limit the invention to the specific embodiments shown and described.

In the following, for the sake of understanding, elements of embodiments are described in operation. However, it will be apparent that the respective elements are arranged to perform the functions being described as performed by them.

Further, the invention is not limited to the embodiments, and the invention lies in each and every novel feature or combination of features described herein or recited in mutually different dependent claims.

Figure 1A:
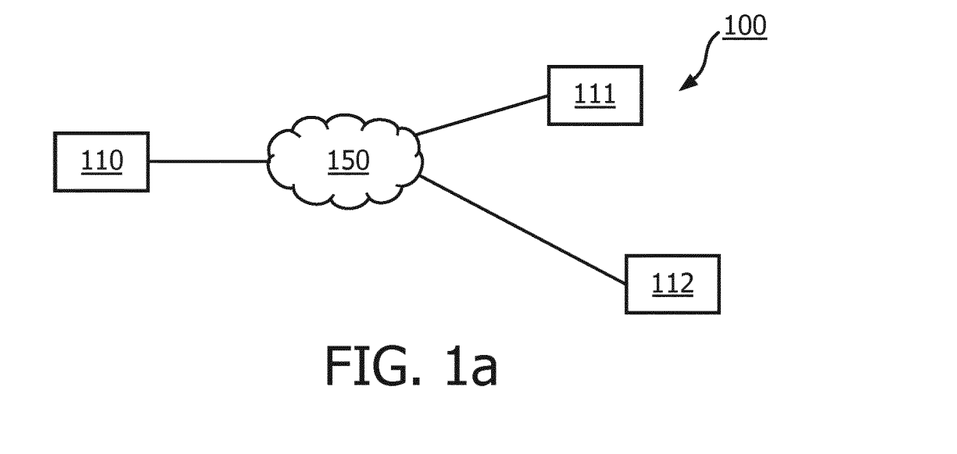

FIG. 1a schematically shows an example of an embodiment of a multiparty computation system 100. FIG. 1a shows multiple computation devices; shown are computation devices 110, 111 and 112. There may be more than 3 computation devices.

The multiple computations devices may be configured for a MPC protocol. For example, each of the multiple devices may have private data over which the multiple computation devices jointly perform a computation. For example, the devices may be configured to send and receive secret-shares of values, and to perform computations on the secret-shares.

The various devices of system 100 communicate with each other over a digital network 150, e.g., a computer network. The digital network may be an internet, an intranet, a LAN, a WLAN, etc. Digital network 150 may be the Internet. The digital network may be wholly or partly wired, and/or wholly or partly wireless. For example, the digital network may comprise Ethernet connections. For example, the digital network may comprise wireless connections, such as Wi-Fi, ZigBee, and the like. The devices comprise a communication interface which is arranged to communicate with other devices of system 100 as needed. For example, the connection interface may comprise a connector, e.g., a wired connector, e.g., an Ethernet connector, or a wireless connector, e.g., an antenna, e.g., a Wi-Fi, 4G or 5G antenna. For example, the multiple computation devices, e.g., devices 110, 111 and 112, may each comprise a communication interface. Digital network 150 may comprise additional elements, e.g., a router, a hub, etc. The multiple computation devices may use the communication interface to communicate with each other, e.g., to send and receive digital messages. The messages may be used, e.g., to send and receive secret-shares of values on which the MPC operates. The messages may be sent and received in electronic form.

Figure 1B:
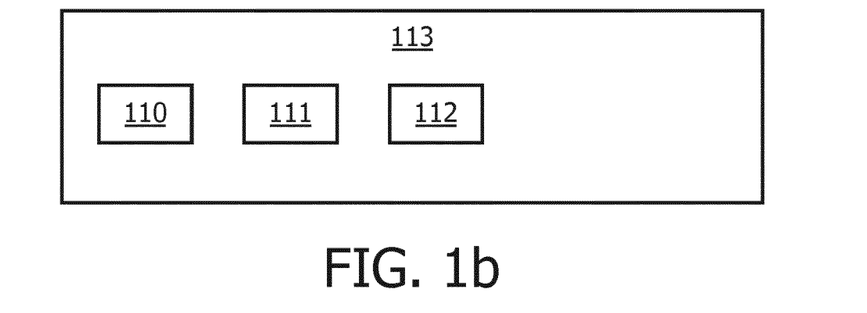

Instead of communication over a digital network 150, there are other ways to constitute a computation system. For example, FIG. 1b schematically shows an example of an embodiment of a multiparty computation system 113. In system 113 multiple computation devices, or units, are comprised in a single larger device 113. For example, these may be applications and/or hardware elements that are mutually mistrustful of each other. In case of system 113, the communication interface may be an intra-device communication interface, a function call, an API, a bus, etc.

Figure 1C:
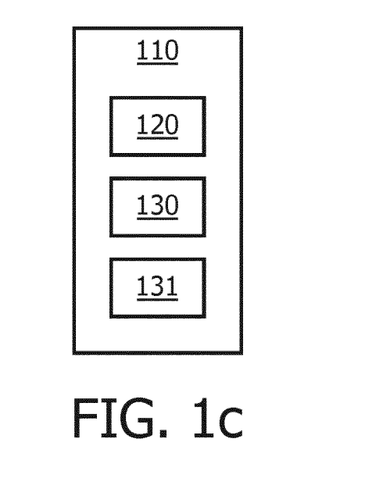
Figure 1D:
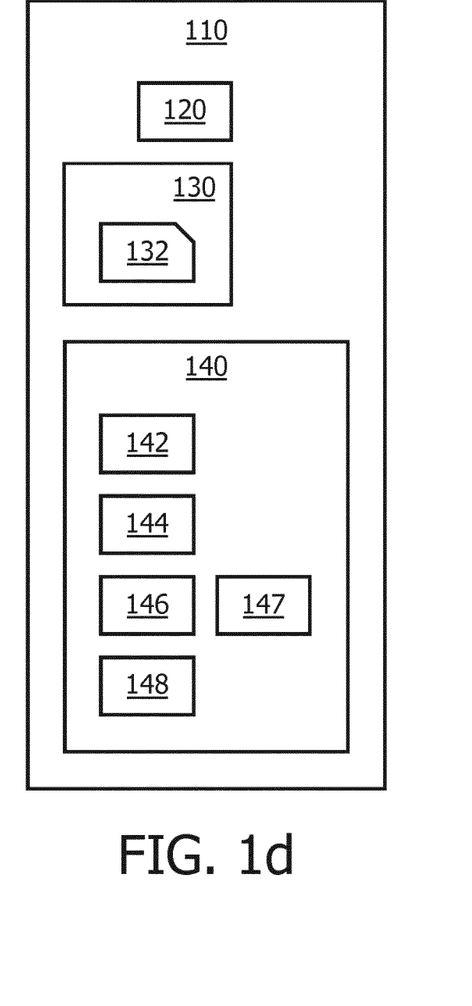

The execution of a computation device is implemented in a processor. For example, the processor may be a microprocessor, FPGA, ASIC, or combination thereof. The processor may be provisioned, e.g., within a cloud computing architecture, etc. Further examples are shown herein. FIG. 1d schematically shows functional units that may be functional units of the processor. For example, FIG. 1d may be used as a blueprint of a possible functional organization of the processor. For example, the functional units shown in FIG. 1d, e.g., the multiparty computation unit 140, may be wholly or partially be implemented in computer instructions that are stored at device 110, e.g., in an electronic memory of device 110, and are executable by a microprocessor of device 110. In hybrid embodiments, functional units are implemented partially in hardware, e.g., as coprocessors, and partially in software stored and executed on device 110. FIG. 1c schematically shows a possible embodiment of computation device 110. FIG. 1c shows a computation device 110 comprising a communication interface 120, a processor 131 and a memory 130. Memory 130 may be used for data and/or instruction storage.

Returning to FIG. 1d. Computation device 110 of FIG. 1d comprises a communication interface 120, a memory 130 and a multiparty computation unit 140.

In the course of the MPC protocol executed by the multiple computation devices some particular computation may be performed multiple times, e.g., according to a multiparty computation protocol. As a result the computation devices store MPC-shares, e.g., secret-shares for the values that occur in these computations. As is usual in a multiparty computation, the devices do not have direct access to one or more, or even to most, of the variables in the computation, but only have a secret-share thereof.

As an example, a secret-share may be a Shamir type secret-share. For example, to share a value t, a party i may receive a value of a polynomial F(i), for which F(0)=t. Instead of Shamir type secret sharing other types may be used. If the polynomial is of degree k, then any coalition of k+1 parties is sufficient to reconstruct the value t. Many variants are possible, including different types of secret sharing.

For example, in Shamir secret sharing for three parties, a value s say may be secret-shared as $[s]_i = s + i \cdot r$ for random r. To multiply secret-shared values s and t, party i may locally compute $[s]_i [t]_i$ and secret-share this value with the other parties; the shares of s·t are then taken to be $[st]_i = 3[[s]_1[t]_1]_i - 3[[s]_2[t]_2]_i + [[s]_3[t]_3]_i$. Although this is only passively secure, it is actively private: a corrupted party can add a known offset of its choice to any multiplication result, but it does not learn anything about the underlying values.

As said, in the course of a larger multiparty computation, a particular computation may be performed multiple times. For example, the computation which is done multiple times could be a multiplication, an inner product, a univariate polynomial or multivariate polynomial over any number of variables, etc. More generally, any computation can be batch verified that can be lifted to a polynomial domain; e.g., a computation for which a set of valid computations can be polynomially interpolated to find new interpolated computations that are also valid. The computation devices are configured to verify the multiple computations batch-wise. In a particular useful embodiment, as will be further explained below, the computation may be a low-level operation which is performed often in the context of a larger multi-party computation. As a first example, the multiple computations may be multiple multiplications: $a_i b_i = c_i$. As a second example, the multiple computations may be multiple inner-products: $a_{i,1} b_{i,1} + a_{i,2} b_{i,2} = c_i$. Below we will mostly use multiplication as an example of a computation, as this is a particular useful choice. By batch-wise verification of all multiplications in an MPC protocol the resistance against active adversaries is significantly increased or may even be completed. Instead of multiplications, embodiments can be adapted to a large variety of computations. The number of multiple computations may be 2 or more, 4 or more, 8 or more, etc.

The computations are performed on a set of variables, which may have different values in the different iterations of the computation. For example, the computation may be the multiplication ab=c; the multiple computations may be multiple instantiations of the same computation wherein the set of variables have different sets of values. For example, the multiple computations may be $a_0 b_0 = c_0$, $a_1 b_1 = c_1$, ..., $a_{n-1} b_{n-1} = c_{n-1}$ in which the values are $a_0$, $b_0$, $c_0$, $a_1$, $b_1$, $c_1$, ..., $a_{n-1}$, $b_{n-1}$, $c_{n-1}$. Typically, the computations are performed over a finite field.

For example, memory 130 may comprise shares 132 of the values in the multiple MPC computations. We will indicate a share of a number with square brackets. If unclear from context, an index outside the square brackets indicate with which device the share is associated. For example, in case the multiple computations are multiple multiplications, then shares 132 in the memory may be the values $[a_i]$, $[b_i]$, $[c_i]$. In case the computations are inner-products $a_{i,1} b_{i,1} + a_{i,2} b_{i,2} = c_i$, then shares 132 stored in memory 130 may be the shares $[a_{i,1}]$, $[b_{i,1}]$, $[a_{i,2}]$, $[b_{i,2}]$, $[c_i]$.

Instead of comprising a memory 130, computation device 110 may also have access to the shares in the computations through other means. For example, device 110 may access a cloud storage, e.g., through the communication interface. For example, in an embodiment a cloud storage comprises shares for each of the values in the multiple sets of values ($[a_i]$, $[b_i]$, $[c_i]$; $[a_{i,1}]$, $[b_{i,1}]$, $[a_{i,2}]$, $[b_{i,2}]$, $[c_i]$). If shares are needed the computation device can retrieve them from the cloud storage and/or store them in the cloud storage. For example, shares in shadow computations, randomizing computations, etc., may also be stored in the cloud storage. A hybrid solution in which part of shares are stored locally, and part are stored in the cloud storage is also possible. For example, in an embodiment, the cloud storage stores the shares in the computations that need to be verified, but shares that are produced in the course of verifying, e.g., shares in shadow computations, and/or a randomizing computation, may be stored locally, say, in a memory.

Shares 132 of the values in the multiple computations which are to be batch-verified are typically obtained by executing an MPC protocol. For example, MPC unit 140 may comprise a computation unit 142 configured to perform a particular computation, e.g., a multiplication, etc., in an MPC fashion. Computation unit 142 may be used multiple times to perform the computation multiple times, which can later be checked in batch.

For example, computation unit 142 may be configured to perform a multiparty computation protocol to compute at least one of the values in a set of values in the multiple computations thus obtaining a share of the value stored in the memory. For example, in the computation, part of the values in the computation may be inputs and another part may be outputs which are computed from the inputs. For example, in case of a multiplication computation, the values $a_i$ and $b_i$ may be considered as inputs from which the output $c_i$ is computed.

Note that it is not needed, that the same variables are input or output throughout the multiple computations (although this may be the case in some embodiments). For example, in one of the computations the value $c_i$ may be computed form the values $a_i$ and $b_i$, whereas in another the value $a_i$ may be computed form the values $c_i$ and $b_i$. However, the computational relationship between the variables is the same throughout the multiple computations. In an embodiment, one variable is an output variable, and the remaining variables are input variables, e.g., the output variable can be computed deterministically from the input variables.

For example, in case of multiplication, computation unit 142 may be configured to multiply two multiplicands, say x and y, to obtain a product, say z. Computation device 110 may only have shares [x] and [y] though, e.g., in memory 130, e.g. in shares 132. Computation unit 142 may be configured to multiply the shares [x] and [y] and to receive similar products from the other computation devices (e.g., devices 111 and 112). In this way, computation unit 142 obtains multiple shares ($[z_1]_i$, $[z_2]_i$, . . . ) of multiple products. Finally, computation unit 142 computes the share [z] from these values as is known in the art. In other words, given the shares [x] and [y], the share [z] is obtained by computation unit 142.

As said, shares 132 are typically obtained in the course of a MPC protocol, but this is not strictly necessary. Device 110 may also obtain the shares from another source, e.g., with the express purpose to verify them. For example, device 110 may be a dedicated verification device.

To batch-verify the multiple computations, we make use of the Schwartz-Zippel lemma. Correctness of the batch of computations is expressed in terms of a polynomial identity, e.g., P(x)=0. For example, in case of verifying a multiplication, the polynomial identity could be A(x)B(x)−C(x)=0 or A(x)B(x)=C(x). By the Schwartz-Zippel lemma, if evaluation of this polynomial P in a random point x gives zero, then with high probability, the polynomial itself is zero, and so the multiple computations are correct. It is not possible to apply this lemma directly since knowledge of the polynomial P in a point would leak information about the computations that are being verified. This problem is resolved by adding a randomizing computation to the multiple computations.

MPC unit 140 is configured to perform the computation a further time, e.g., using computation unit 142. The further computation may be done like the rest of the multiple computations, e.g., using multiparty computation with the multiple computation devices. For example, in case of multiplication, the same type of multiplication protocol as described above may be used. MPC unit 140 comprises a random number unit 144 configured to jointly derive a random number with the multiple computation devices. Ideally, random number unit 144 is configured so that each of the computation devices contributes entropy to the random number yet none of the computation devices can decide the random number, or even steer it in a particular direction.

For example, MPC unit 140 may select part of the variables in the computation and assign a random value, e.g., computed by random number unit 144, and have the remaining values of the variables computed, e.g., by computation unit 112. In this way, the computation device obtains shares for the randomizing set of values in the randomizing computation. For example, in case of the multiplication example, the random number unit 144 may select a random value $a_n$ and $b_n$ and use the MPC multiplication protocol to compute $c_n$. In this way, one additional computation is obtained with satisfies the same computational relationship as the other computations. Since the values in the randomizing computations are either selected randomly or computed from random values they cannot leak information about any of the other computations.

Random number unit 144 may use a known MPC protocol for multiparty selection of a random number. In an embodiment, the random number unit 144 is configured to derive a share of the random number. If the random number itself is needed, rather than a share, the parties can exchange shares so that the random number can be derived, e.g., opened. The random number unit 144 may be used for various purposes, e.g., to derive random inputs to the randomizing computation and for derive the random value s for the polynomial interpolation.

For example, random number unit 144 may be configured to generate one or more shares ($[r_{1,2}]$, $[r_{1,3}]$) of one or more random numbers ($r_{1,2}$, $r_{1,3}$) with one or more computation devices of the multiple other computation devices and/or receive one or more shares ($[r_{2,3}]$) of a random number generated by a subset of the multiple other computation devices.

For example, the random number shares may be computed by multiple subsets, also called coalitions, of the multiple computation devices. The multiple coalitions are chosen such that for each device there is at least one coalition in which he is a member and at least one coalition in which he is not. For example, in case of n computation devices, with n=2t+1, the coalitions may be all subsets of t+1 computation devices.

For example, each coalition, e.g., in case of n=3, each pair of devices, may have a joint random number generator, e.g., obtained from a joint secret which may be used as a seed. From a random value r known by the devices in a coalition, shares may be computed for all of the devices, including for the devices in the coalition. Finally, once random number shares are known for each of the multiple subsets, the shares for the random numbers may be added.

Random number unit 144 is used to select random values for one or more of the variables in the computation, after which computation unit 142 is used to perform the randomizing computation. For example, random number unit 144 may be arranged select an and $b_n$ so that each party has a share of these two numbers. Note that at no point it is required to trust anyone with the values $a_n$ and $b_n$. Computation unit 142 cooperates with the other computation devices to compute a share of $c_n$.

At this point in the verification, the computation device 110 has access to the multiple computations, say $a_i b_i = c_i$ for $0 \le i < n$, and a randomizing computation, say $a_n b_n = c_n$—that is to shares of the values therein. One way to verify these computations in batch fashion is to fit a polynomial A to the values $a_i$, a polynomial B to the values $b_i$, and a polynomial C to the values $c_i$, for $0 \leq i \leq n$. For example, a set of basepoints $\omega_i$ may be selected so that $A(\omega_i)=a_i, B(\omega_i)=b_i, C(\omega_i)=c_i$. For example, the fitting may be done by an interpolation unit 147. Next a check unit 146 can verify the interpolated computation $A(s)B(s)=C(s)$ for a random value s. Random value s may be computed by random number unit 144. Interestingly, after the random number s may be opened after it has been derived, and before the interpolation. This simplifies the interpolation. The values in the interpolated computation, e.g., A(s), B(s), C(s), may be opened after they have been computed and before the interpolated computation is checked, this simplifies the verification.

Note that these computations may be performed on secret-shared values, so that, rather than the values A(s), B(s), and C(s) a device initially only obtains access to a secret-share of these values. After shares are obtained, one or more of the parties may send their shares of the interpolated values in the interpolated computation to computation device 110. This allows check unit 146 to open the values and to verify the computation on plain values. The latter is possible because the fitted polynomials are computed over values that include a randomizing value. Because of this the values A(s), B(s), C(s), etc., are also randomized. Note that other MPC protocols for verifying the interpolated computation may be used, e.g., which do not require opening of the interpolated values. Such protocols may incur more overhead though.

The polynomials are interpolated for a random numbers. The random numbers may be selected by random number unit 144, e.g., as described above. The random number s need not be kept secret, and may be opened after it is shared, which simplifies the protocol. For example, computation device 110 may receive shares of the random number s from one or more of the other multiple computation devices and use it to open s. Likewise, computation device 110 may send his share of random number s to other computation devices, e.g., device 111 and 112.

To increase security, computation device 110 may be configured to compute the random number from multiple different sets of shares, the processor being configured to verify that the computed and recomputed random number s are equal. If different computations of the same number are the same, this implies an error or an attempt at tampering.

Interpolation done below is done with respect to a series of base numbers. MPC part 140 verifies that the random number s is not included in the series of base numbers $\omega_i$. If random number s is included in the series of base numbers or is 0, a new random number is generated.

It is not actually needed to fit polynomials, it is sufficient to compute the values in the interpolated computation. This may be done by polynomially interpolating the shares for the value of each variable in the multiple computations, e.g., $[a_i]$ or $[b_i]$ or $[c_i]$, and in the randomizing computation, e.g., $[a_n]$ or $[b_n]$ or $[c_n]$ with respect to a series of base numbers $(\omega_i)$ to the random number, thus obtaining a share of a polynomially interpolated value ($[A(s)]$; $[B(s)]$; $[C(s)]$). For example, this may be done using Lagrange interpolation. Computing the polynomial value for the random number s avoids having to compute the full polynomials. Note that the interpolations can be done locally since the number s is plain.

There is a further complication if the computation is not homogeneous, which is typical. For example, if such a computation, e.g., the multiplication ab=c, is lifted to the polynomial domain, e.g., AB=C, then the polynomials are not all of the same degree. In this example, the degree of the polynomials is each at least equal to the number of multiple computations plus the number of randomizing computations minus 1; However, the degree of polynomial C is larger, since it is to be equal to the product of two polynomials. In general, the degrees of the polynomials are taken as small as possible.

Because one of the polynomials, e.g., C, has a higher degree, this means that it needs more points for interpolation than others. This can be resolved by first interpolating the low-degree polynomials, in this example A and B, and using that to interpolate further interpolated shares. For example, once we have $A(\omega_i)=a_i, B(\omega_i)=b_i$, for $0 \leq i \leq n$ these can be used to compute A and B for further basepoints—as many as are needed to interpolate the higher degree polynomials, e.g., C. For example, one may compute interpolated values $A(\omega_i)=a_i, B(\omega_i)=b_i$, for $n+1 \leq i \leq 2n-1$. Once these values are available, the corresponding values of $c_i$, for $n+1 \leq i \leq 2n-1$ can be computed, e.g., by performing the computation again. The latter computation may be done as multiparty computation, e.g., using computation unit 142. The additional computations to compute additional values for one or more of the variables are sometimes referred herein as shadow multiplications.

Once the values, or the shares of the values, for the $c_i$ are available, the polynomial C may be interpolated using the additional interpolated shares. Again, it not actually necessary to compute the fitted polynomials, it is sufficient to compute the required values of these polynomials, in particular the interpolated shares for, e.g., $a_i, b_i$, for $n+1 \leq i \leq 2n-1$, and the interpolated computation $A(s)B(s)=C(s)$; e.g., using MPC interpolation on the shares, e.g., Lagrange interpolation. Furthermore, also here the interpolation may be done on shares, and not on the actual values.

Other examples of computations that can be checked in this manner. Are the following:

Example 1: The computation ab=cd, is homogeneous and can be lifted to AB=CD. To generate a randomizing computation any three of the variables may be randomly selected and the fourth may be computed. It is not needed to generate additional values for interpolation, only for randomization.

Example 2: The computation ab+d=c is not homogenous. It can be lifted to AB+D=C. The degree of C is higher than that of A, B and D. Additional values can be computed by interpolating polynomials A, B, and D first and computing the corresponding values for C.

Example 3: The computation a+b=cd can be lifted to A+B=CD. In this case the degrees of A and/or B may be higher. This can be resolved by first interpolating the values of C and D. At this point the values for A and B are not determined, but this can be resolved by generating random values for one of A and B or setting it to a fixed, or predetermined value(s), e.g. to 0, and computing the other one of A and B, until sufficient values are known to compute the interpolated computation. For example, both of the degree of A and B may be equal to the sum the degrees for C and D. Alternatively, the degree of one of A and B may be taken small, e.g., equal to the degrees of C and D. In the latter case, further values for that polynomial may be interpolated from the existing computations.

Example 4: the computation $a^2+a=b$ can be lifted to $A \cdot A+A=B$. In this case the degree of B is higher. This can be resolved by first interpolating A to compute additional values, then compute the corresponding values for B and finally interpolate to the random value s.

Once the interpolated computation is known-shared across the multiple computation devices-they can be opened so that the values can be checked. For example, computation device 110 may receive a further share of the polynomially interpolated values from one or more of the multiple other computation devices, compute the corresponding polynomially interpolated values, e.g., $A(s), B(s), C(s)$, and verify the computation therefor ($A(s)B(s)=C(s)$). Note that the polynomially interpolated values are opened after computation and available in the plain, so that verifying the computation is straightforward. For example, at least one coalition that is large enough to open a share, sends their shares to one party, who can then open the interpolated computation and check it. For example, each device in the coalition could send its shares in the interpolated computation to each device in the coalition. For example, each device could send its shares in the interpolated computation to each other device.

In principle the basepoints can be chosen as any desired set of point in the base field. However, the values required for batch-wise multiplication verification can be efficiently computed using FFTs. Recall that a FFT over a finite field converts the coefficients of a degree (n−1) polynomial to its evaluations in n points; and its inverse converts the evaluations back into polynomials. If n=2k for some k and the set of points are the powers of a n-th root of unity (or a constant times those powers), then the FFT and its inverse can be computed efficiently in (n log n) using the Cooley-Tukey algorithm. For example, interpolating the variables may be done using an FFT. Moverover, if the same s is re-used for multiple checks, then the interpolations can be combined with interpolating to random numbers, so that the corresponding FFTs become a single linear transformation from evaluations in the $\omega_i$ to an evaluation in s. For example, the computation devices may be configured to verify computations in batches of N calculations. A next set of N calculations could reuse the same random numbers. This not only saves generating the random number, but also simplifies the verification. The linear transformations that needs to be computed to interpolate the interpolated computation may be taken the same. For example, suppose kn computations need to be verified, with k>1, then s may be generated once, and used to verify k batches of n computations. Security is improved if the random number s is not re-used to verify computations that were computed after the random number s was generated.

The probability that all of the multiple computations were indeed correct if the interpolated computation is correct increases with the size of the finite field in which the computations are performed. This probability can be increased by increasing the field. This could be done by generating the random number s in an extension field. Unfortunately, this will have the consequence that the subsequent interpolation and/or the shadow computations may also have to be performed in the extension field, adding additional overhead to the computation. In an embodiment, the random number s is selected from the same field as the variables and/or shares of the computation.

A better way to do increase the probability is to perform the check for multiple random numbers s. For example, computation device 110 may be configured to generate jointly with the multiple other computation devices multiple random numbers ($s_i$). For example, in case of multiplication, it may be checked that $A(s_i)B(s_i)=C(s_i)$, for more than one value of i, e.g., 2 or more, 4 or more, etc.

To avoid leaking information when multiple random number $s_i$ are used, embodiments may use multiple randomizing computations. For example, in an embodiment, the computation of the interpolated computation is repeated for each of the $s_i$, e.g., using a different randomizing computation for each interpolated computation and $s_i$. In another embodiment, multiple randomizing computation are added to the multiple computations so that the resulting interpolated computation can be polynomially interpolated for multiple values $s_i$ without leaking. For example, the number of multiple randomizing computations may be the same as the multiple random numbers.

The verification may be applied to various computations. For example, multivariate polynomial $P(x_1, x_2, \ldots, x_n)=y$ can be batch-wise verified in this manner. Given n multiple computations, the shares for the variables $x_i$ may be polynomially interpolated for a polynomial of degree n (including one randomizing computation). The shares for the variable y may be polynomially interpolated with a degree of dn, wherein d is the total degree of P. In this way the interpolated $P(X_1(s), X_2(s), \ldots, X_n(s))=Y(s)$ may be checked. The shares for variables $x_i$ may be polynomially interpolated to obtain $(dn+1)-(n+1)=d(n-1)$ additional values, so that variable y may be properly interpolated as well.

This construction adds only modest communication overhead compared to passively secure Shamir based protocols. For example, consider a passive Shamir protocol which requires communication of three secret field elements per multiplication, e.g., if one of the secret-shared values is implicitly defined by a shared pseudo-random function. In an embodiment, adding batch verification requires about one additional multiplication $A(\omega_i)-B(\omega_i)$ for each real multiplication $a_i b_i$ giving six field elements of communication per multiplication, plus a small constant number of elements per batch.

Figure 2A:
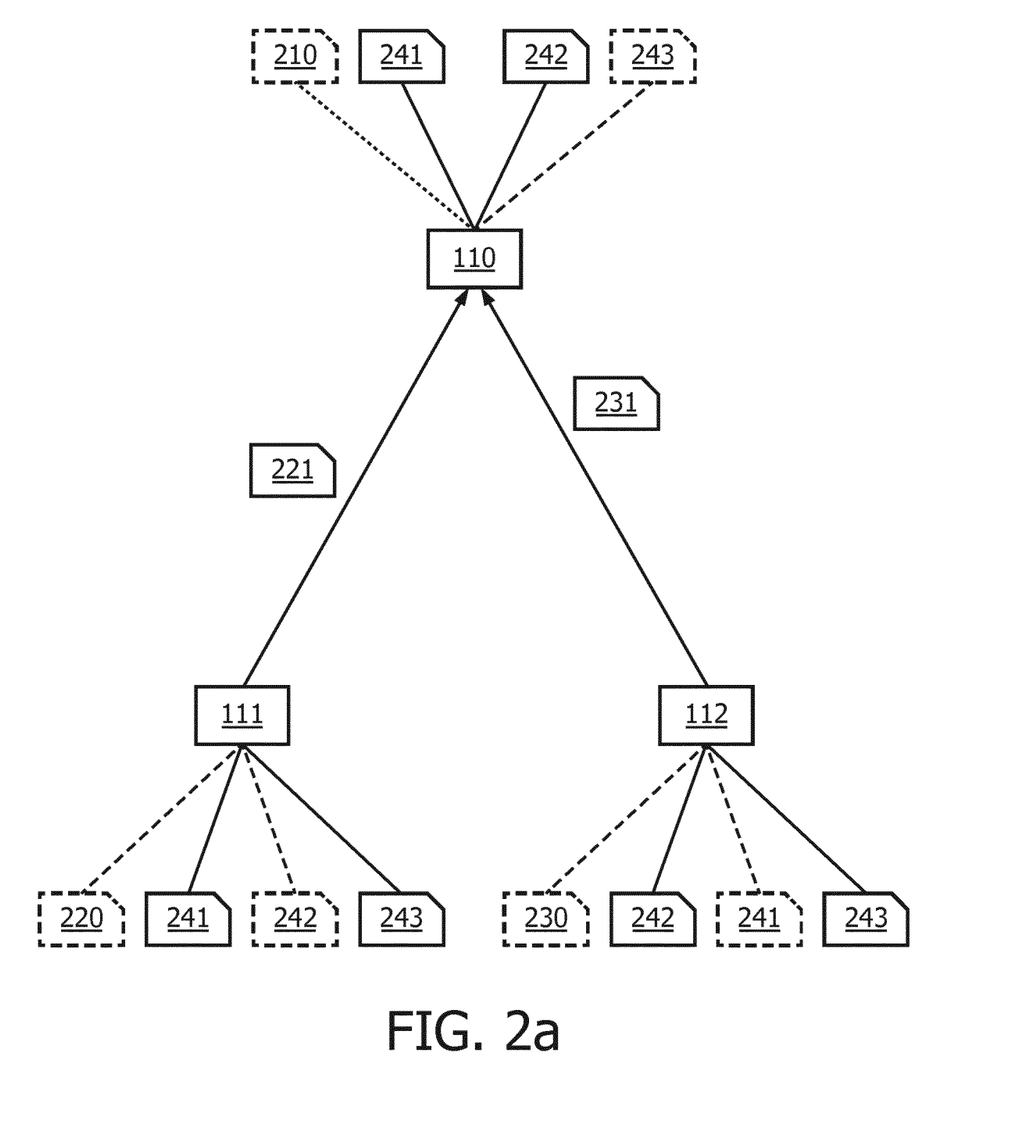

FIG. 2a schematically shows an example of an embodiment of opening a value. In embodiments, various values may need to be opened. For example, opening values may be needed for purposes unrelated to the batch verification. For example, the multi-party computation may have an end result that needs to be opened to one or more of the parties. For example, computation device 110 may comprise an open unit 148 configured to execute a protocol for opening a value.

Opening the final result of the computation, may be done by a MPC opening procedure. However, there is a potential problem in that fairness may not be guaranteed if an attacker can simply send out garbage shares and each honest party has no way of knowing which of the other parties to trust. This may be combatted by letting a party A open result r to party B as well as an information-theoretic MAC, e.g., $\alpha r+\beta$, where B knows $\alpha$, $\beta$ and A does not. An honest A will send r with a correct MAC, while a malicious A is unlikely to succeed in opening a wrong r with a matching MAC. Hence, B knows which result to trust and we have fairness.

In an embodiment, computation device 110 and the other computation devices are configured so that computation device 100 opens a value x. Computation device 110 both receives shares from other computation devices and message authentication codes. Using the shares allows the computation device 110 to open the value x in at least two different ways. Using the message authentication codes, allows computation device 110 to verify if the opened value can be trusted and, if the values differ, which one to trust.

First the concept is explained with respect to FIG. 2a for three computation devices 110, 111 and 112. It can be generalized to larger sets of computation devices though.

Computation device 110 has share 210, $[x]_1$ of the value x. Computation device 111 has share 220, $[x]_2$ of the value x. Computation device 112 has share 230, $[x]_3$ of the value x. Different keys are used for message authentication codes. A first key 241 is known to computation device 110 and to computation device 111. A second key 242 is known to computation device 110 and to computation device 112. A third key 243 is known to computation device 111 and to computation device 113. All devices have a share of all keys, e.g., keys 241, 242 and 243. In FIG. 2a, shares are depicted as dashed boxes. It is assumed that a party who knows a value, e.g., keys 241 and 242, also has a secret-share for the value so that it can participate in MPC computations involving the value. A third key is known to devices 111 and 112, but not to device 110. Note that any coalition of, in this case 2 devices, have one key in common, which is not known to devices outside the coalition.

Generating a key known to two or more devices may be done by a pseudorandom number generator that is comprised in the two or more devices; e.g., the two or more devices may know a common seed which is used to generate random numbers at the two or more devices. For example, random number generator 144 may be used to generate the keys. After generating a key at two or more devices, shares of the key may be obtained by each of the computation devices. The latter may be done by communication the corresponding shares, but interestingly, this may also be done without communication. This is possible since shares may be chosen so that computation devices which do not have access to the joint random number generator get a fixed value share, e.g., 0, whereas the devices that do have access can compute the corresponding shares, taking the fixed shares into account.

Keys 241 and 242 are used for message authentication codes. For example, the message authentication codes may be information theoretic message authentication codes, in which case the keys 241 and 242 could be pairs of numbers. For example, key 242 may be the pair of number $\alpha,\beta$. For example, key 241 may be the pair of numbers $\gamma,\delta$. The keys may be generated as random number as indicated above.

In order for computation device 110 to securely open number x, the parties may proceed as follows:

Computation device 110 receives information 221 from device 111 comprising the share 220, $[x]_2$ of the value x and a share of a first message authentication code, e.g., $[\alpha x+\beta]$, over the value x computed with key 242. That is, computation device 111 sends a share of a message authentication code of which it only has a share of the key, not the plain value. The message authentication code can be computed by the parties using MPC multiplication and addition.

For example, computation device 110 receives information 231 from device 112 comprising a share 230, $[x]_3$ of the value x and a share of a second message authentication code, e.g., $[\gamma x+\delta]$, over the value x computed with key 241. As a result of the MPC computation of the first and second message authentication code, computation device 110 also comes in possession of its own share of the first and second message authentication code.

At this point, computation device 110 has three shares for value x, and two shares for each of the two message authentication codes. This means that computation device 110 can open both message authentication codes. Computation device 110 can open value x twice: once with shares 210 and 220, once with shares 210 and 230. Moreover, the computation device 110 can verify the message authentication codes since it has the plain values of the corresponding keys.

Computation device 110 can now decide as follows. If neither message authentication code is correct, the protocol is corrupted and is terminated. If one of the message authentication codes is correct, then the value of x is computed from shares that are received from that coalition which is now trusted. For example, if the message authentication code computed from a share of computation device 111 is correct, then the value of x computed from shares 220 and 210 is trusted. If both message authentication codes are correct but the values of x are different, something is wrong and the protocol may be terminated. In an embodiment, deice 112 and 113 can do the same.

The above protocol to open a value x can be extended to larger groups of computation devices, say we have n=2t+1 computation devices. In this case, each device may have a share of the value x. Each device that is to open x has access to at least two plain authentication keys. The other devices have plain access to at most one of them, but do have access to a share of both authentication keys. Two different coalitions of t+1 devices send their share of x to computation device 110 and compute a message authentication code for one of the keys known in the plain by computation device 110. For example, one way to organize this is as follows: For each coalition of t+1 devices, generate a message authentication key. The members of the coalition have plain access to the key, the other devices have access to a share of the key. To open x to all devices, each device sends its share to each other device, and joins in an MPC computation of the message authentication code for each key. Each computation device can now select a coalition for which it can verify the message authentication code, and reconstruct x.

For example, in an embodiment, computation device 110 generates keys which it and at least one other device knows, shares are distributed by computation device 110 or by the other device. Computation device 110 may also receive shares of keys that it does not know. Computation device 110 then participates in computing message authentication codes for the various keys in a MPC. Computation device 110 receives shares of message authentication codes for keys that it knows, and may send shares of message authentication codes for keys that it does not know. Computation device 110 receives a sufficient number of shares to open at least two message authentication codes for keys that it knows. Computation device 110 then open the message authentication codes and verifies them using the corresponding key that it knows.

It is noted that the above way of opening a value may be advantageously applied in other MPC contexts, for example, without applying a method of batch verification. For example, an example of an advantageous computation device is the following: A computation device configured for multi-party computation with multiple other computation devices, the computation involving at least one value which is shared among the computation device and the multiple other computation devices, the computation device comprising
- a communication interface configured for digital communication with the multiple other computation devices,
- a memory configured to store the share for the values ([x])
- a processor configured to open the value (x) in the computation, the processor being configured to
  receive a share ($[x]_2$) of the value (x) and of a first message authentication code ($[\alpha x+\beta]$) over the value (x) from a first other computation device ($P_2$) of the multiple other computation devices, and
  receive a share ($[x]_3$) of the value (x) and a second message authentication code ($[\gamma x+\delta]$) over the value (x) from a second other computation device ($P_3$) of the multiple other computation devices,
  verify the received first and second message authentication codes and compute the value (x) from the share ($[x]_2$, $[x]_3$) of the value (x) corresponding to a valid message authentication code.

The latter computation device may be advantageously combined with features as described herein or otherwise, such as batch verification, generation of random numbers, various MPC protocols, e.g., MPC multiplication, etc.

Figure 2B:
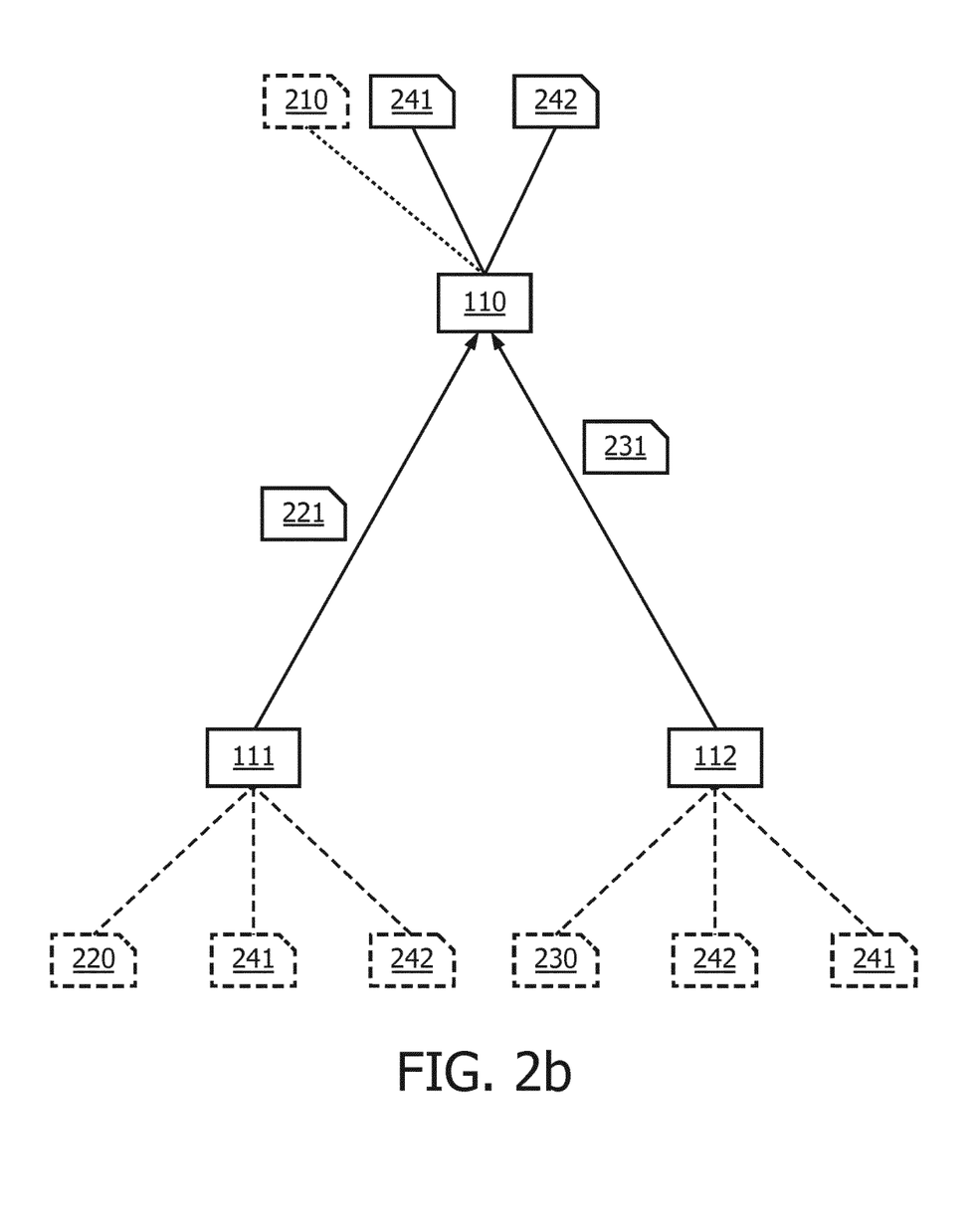

FIG. 2b schematically shows an example of an embodiment of opening a value. The method illustrated with FIG. 2b is a variant on that of FIG. 2a. The devices in FIG. 2b are configured to open the value x but only to device 110. In this case, key 243 can be omitted, moreover, devices 111 and 112 only need a share of keys 241 and 242 instead of knowing one of them.

The computation device may have a user interface, which may include well-known elements such as one or more buttons, a keyboard, display, touch screen, etc. The user interface may be arranged for accommodating user interaction for performing a multi-party computation, a MPC verification, opening a value etc. Memory 130 may be implemented as an electronic memory, say a flash memory, or magnetic memory, say hard disk or the like. Memory 130 may comprise multiple discrete memories together making up memory 130. Memory 130 may also be a temporary memory, say a RAM.

Typically, the devices 110, 111 and 112 each comprise a microprocessor which executes appropriate software stored at the device; for example, that software may have been downloaded and/or stored in a corresponding memory, e.g., a volatile memory such as RAM or a non-volatile memory such as Flash. Alternatively, the computation devices may, in whole or in part, be implemented in programmable logic, e.g., as field-programmable gate array (FPGA). The devices may be implemented, in whole or in part, as a so-called application-specific integrated circuit (ASIC), e.g., an integrated circuit (IC) customized for their particular use. For example, the circuits may be implemented in CMOS, e.g., using a hardware description language such as Verilog, VHDL etc.

In an embodiment, computation device 110 comprises a digital network circuit, a communication interface circuit, a memory circuit, a multiparty computation unit circuit, a computation unit circuit, a random number unit circuit, a check unit circuit, an interpolation unit circuit, an open unit circuit. The device 110 may comprise more or fewer circuits. The circuits implement the corresponding units described herein. The circuits may be a processor circuit and storage circuit, the processor circuit executing instructions represented electronically in the storage circuits.

A processor circuit may be implemented in a distributed fashion, e.g., as multiple sub-processor circuits. A storage may be distributed over multiple distributed sub-storages. Part or all of the memory may be an electronic memory, magnetic memory, etc. For example, the storage may have volatile and a non-volatile part. Part of the storage may be read-only.

Below a detailed exposition of particular exemplifying embodiments is given of a three-party MPC. Embodiments are resistant against one active corruption, and have low bandwidth use, e.g., approximately six field elements exchanged per multiplication, and have high performance.

The protocol is shown in the three party setting between parties $P_1$, $P_2$ and $P_3$ that each play symmetric roles. The parties in our protocols communicate over private channels. We use the notation [n] to denote the set of integers $1, \ldots, n$. For a pseudo random generator prg we use the notation $r:=prg(S)$ to indicate sampling r in S using prg. We generally work in the field $Z_p$ for some $p > 2^\sigma$. The factor $\sigma$ is a security parameter; larger values are more secure. Our protocols are provably secure in a three party setting with an active, static adversary able to corrupt at most one of the parties. We consider security with abort, but while providing fairness.

Setup:

Each pair of parties $P_i$, $P_j \in \{P_1, P_2, P_3\}$ sets up a joint $prg_{P_i,P_j}$ Input:

To let a party input value x into the computation as secret-share [x], the parties may proceed as follows:

1. Input $P_1$: let $r:=prg_{P_1,P_2}$; $P_1$ sets $[x]_1=(x+r)/2$; $P_2$ sets $[x]_2=r$; $P_3$ gets $[x]_3=(3r-x)/2$ from $P_1$ 2. Input $P_2$: let $r:=prg_{P_2,P_3}$; $P_1$ gets $[x]_1=(2x+r)/3$ from $P_2$; $P_2$ sets $[x]_2=(2r+x)/3$; $P_3$ sets $[x]_3=r$ 3. Input $P_3$: let $r:=prg_{P_3,P_1}$; $P_1$ sets $[x]_1=r$; $P_2$ gets $[x]_2=(2r-x)$ from $P_3$; $P_3$ sets $[x]_3=(3r-2x)$;

Add/multiply by constant: To compute $[z]\leftarrow[x]+[y]$ or $[z]\leftarrow a[x]$, the parties may proceed as follows:

1. $P_i$ sets $[z]_i$ to $[x]_i+[y]_i$ or to $\alpha[x]_i$

Multiply:

To compute $[z]\leftarrow[x]\cdot[y]$, the parties may proceed as follows:

Party $P_i$ computes $z_i$ as $[s]_i [t]_i$, and inputs $z_i$ to the computation. Each party sets $[z]_i=3[z_1]_i-3[z_2]_i+[z_3]_i$ Random Shared Values:

To generate secret-shares of random values, the parties may proceed as follows:

To generate random [r] known by $P_1$, $P_2$, let $r:=prg_{P_1,P_2}$ and set $[r]_1=2r/3$, $[r]_2=r/3$, $[r]_3=0$ To generate random [r] known by $P_1$, $P_3$, let $r:=prg_{P_1,P_3}$ and set $[r]_1=r/2$, $[r]_2=0$, $[r]_3=-r/2$ To generate random [r] known by $P_2$, $P_3$, let $r:=prg_{P_2,P_3}$ and set $[r]_1=0$, $[r]_2=-r$, $[r]_3=-2r$ To generate random [r], generate $[r_{1,2}]$, $[r_{1,3}]$, $[r_{2,3}]$ as above and set $[r]=[r_{1,2}]+[r_{1,3}]+[r_{2,3}]$ Multiplication Check (Batch Size n):

To check correctness of multiplication results $[c_1]\leftarrow[a_1]\cdot[b_1], \ldots, [c_{n-1}]\leftarrow[a_{n-1}]\cdot[b_{n-1}]$, the parties may proceed as below. The notation $[c_1]\leftarrow[a_1]\cdot[b_1]$ indicates that $c_i$ is a share in the multiplication $a_1 b_1$.

1. The parties generate random shared values $[a_n]$, $[b_n]$ and compute $[c_n]:=[a_n]\cdot[b_n]$ 2. Let $A(x), B(x)$ be of degree $\leq n-1$ such that $A(\omega_i)=a_i$; $B(\omega_i)=b_i$ for $i=1, \ldots, n$. Using $[a_i]$ and $[b_i]$, the parties locally compute $[a_{n+1}]\leftarrow[A(\omega_{n+1})], \ldots, [a_{2n-1}][A(\omega_{2n-1})]$, $[b_{n+1}]\leftarrow[B(\omega_{n+1})], \ldots, [b_{2n-1}]\leftarrow[B(\omega_{2n-1})]$.

3. The parties compute shadow computations $[c_{n+1}]\leftarrow[a_{n+1}]\cdot[b_{n+1}], \ldots, [c_{2n-1}]\leftarrow[a_{2n-1}]\cdot[b_{2n-1}]$. The notation $\leftarrow$ indicating that the computation is as above, so that $c_i$ is a share in the multiplication $a_i b_i$ 4. The parties generate random shared value [s] and exchange the shares $[s]_i$. The parties reconstruct s as $s=[s]_2-[s]_1$, and $s'=3[s]_2-2[s]_3$, aborting if $s \neq s'$. This is repeated until $s \in \{0, \omega_1, \ldots, \omega_{2n+1}\}$.

5. Let $C(x)$ be of degree $\leq 2n-2$ such that $C(\omega_i)=c_i$ for $i=1, \ldots, 2n-1$. The parties compute $[A(s)]$ as a linear combination of $[a_1], \ldots, [a_n]$; $[B(s)]$ as a linear combination of $[b_1], \ldots, [b_n]$; and $[C(s)]$ as a linear combination of $[c_1], \ldots, [c_{2n-1}]$ 6. The parties exchange their shares $[A(s)]$, $[B(s)]$, $[C(s)]$, and reconstruct $A(s)=2[A(s)]_1-[A(s)]_2=3/2[A(s)]_1-\frac{1}{2}[A(s)]_3=3[A(s)]_2-2[A(s)]_3$, and similarly for $B(s)$, $C(s)$. The parties abort if for any of the values, the reconstruction is inconsistent, or if $A(s)B(s) \neq C(s)$.

Open:

To open a value [x], the parties may proceed as follows:

1. The parties generate random shared values $[\alpha]$, $[\beta]$ known by both $P_1$ and $P_3$; $[\gamma]$, $[\delta]$ known by both $P_1$ and $P_2$; and $[\varepsilon]$, $[\varphi]$ known by both $P_2$ and $P_3$ 2. The parties compute $[\alpha x+\beta]$, $[\gamma x+\delta]$, $[\varepsilon x+\varphi]$ 3. The parties execute the multiplication check on all multiplications that have not been checked yet, possibly in batches of n.

4. Party $P_i$ sends $[x]_1$, $[\varepsilon x+\varphi]_1$ to the other parties; party $P_2$ sends $[x]_2$, $[\alpha x+\beta]_2$ to the other parties; party $P_3$ sends $[x]_3$, $[\gamma x+\delta]_3$ to the other parties. Each party reconstructs x, $(\cdot_1 x+\cdot_1)$, x', $(\cdot_2 x'+\cdot_2)$ and accepts whichever of x, x' corresponds to its own known values of $\alpha$, $\beta$, $\gamma$, $\delta$, $\varepsilon$ One appealing property of MPC based on Shamir secret sharing is that an inner-product $[a_1][b_1]+\ldots+[a_l][b_l]$ can be computed using the same amount of communication as a single multiplication. We can preserve this property by generalizing batch multiplication verification to verify many inner products of the same length. In the first step, instead of generating two random values and computing their product, we generate 21 random values and compute their inner product. We then define polynomials $A_1(x), \ldots, A_l(x)$, $B_1(x), \ldots, B_l(x), C(x)$ as above and exchange shares of $A_1(s), \ldots, A_l(s), B_1(s), \ldots, B_l(s), C(s)$ and check whether $A_1(s)B_1(s)+\ldots+A_l(s)B_l(s)=C(s)$. This gives the same security guarantees as batch multiplication verification.

The protocol naturally generalizes to a n-party setting where k<n/2 parties may be corrupted. We keep the property that adding active security adds only modest amounts of communication by adding in the multiplication check, e.g., one randomizing multiplication and a shadow multiplication for each regular multiplication.

Figure 3:
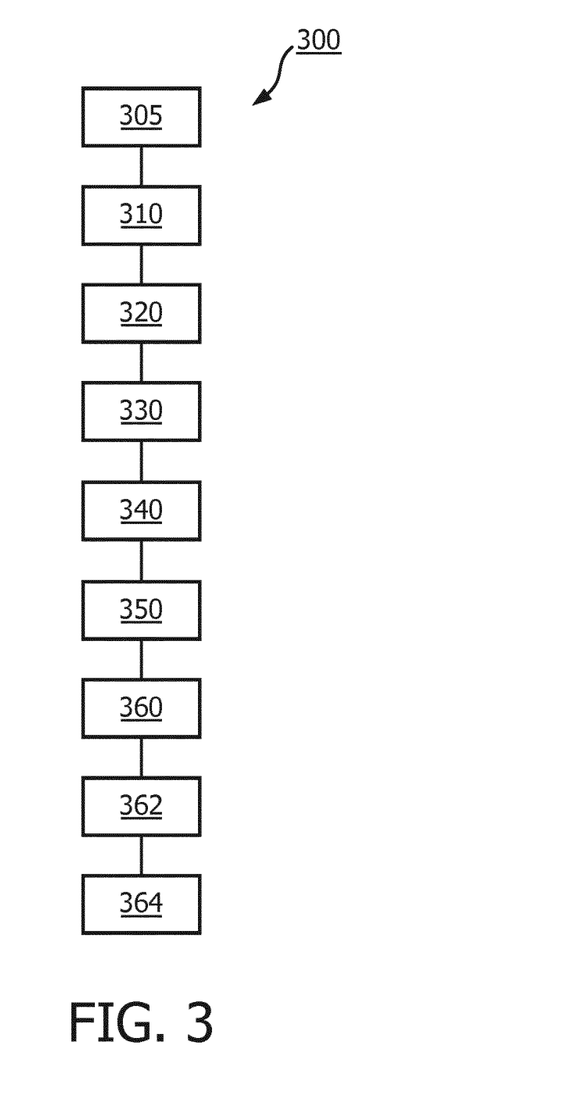

FIG. 3 schematically shows an example of an embodiment of a computation method 300. Computation method 300 is arranged for batch-wise multiparty verification of a computation comprising a set of variables. For example, the computation may have been performed 305 multiple times, e.g., $a_i b_i = c_i$ or $a_{i,1}b_{i,1}+a_{i,2}b_{i,2}=c_i$, etc., wherein the set of variables have multiple sets of values. The computations are multiparty computations that are cryptographically shared between the computation device and multiple other computation devices. Computation method 300 comprises providing 310 digital communication with the multiple other computation devices, storing 320 a share for each of the values in the multiple sets of values, e.g., $[a_i]$, $[b_i]$, $[c_i]$ or $[a_{i,1}]$, $[b_{i,1}]$, $[a_{i,2}]$, $[b_{i,2}]$, $[c_i]$, etc., performing 330 the computation, with the multiple other computation devices, a further time to obtain a randomizing computation, e.g., $a_n b_n = c_n$ or $a_{n,1}b_{n,1}+a_{n,2}b_{n,2}=c_n$, etc., on a randomizing set of values, at least one of the values in the randomizing set of values being randomly selected by the computation device and the multiple other computation devices, the computation device thus obtaining shares for the randomizing set of values, generating 340 with the multiple other computation devices a random numbers, for each variable in the set of variables, polynomially interpolating 350 the shares for the value of the variable in the multiple computations, e.g., $[a_i]$, $[b_i]$ or $[c_i]$, etc., and in the randomizing computation, e.g., $[a_n]$, $[b_n]$, or $[c_n]$, etc., with respect to a series of base numbers $\omega_i$ to the random number, thus obtaining a share of a polynomially interpolated value, e.g., $[A(s)]$, $[B(s)]$, or $[C(s)]$, etc., receiving 360 a further share of the polynomially interpolated values from one or more of the multiple other computation devices, computing 362 the corresponding polynomially interpolated values, e.g., $A(s), B(s)$, or $C(s)$, etc., and verifying 364 the computation therefor, e.g., that $A(s)B(s)=C(s)$.

Many different ways of executing the methods are possible, as will be apparent to a person skilled in the art. For example, the order of the steps can be varied or some steps may be executed in parallel. Moreover, in between steps other method steps may be inserted. The inserted steps may represent refinements of the method such as described herein, or may be unrelated to the method. For example, the interpolating may be executed, at least partially, in parallel. Moreover, a given step may not have finished completely before a next step is started.

Embodiments of the method may be executed using software, which comprises instructions for causing a processor system to perform method 300. Software may only include those steps taken by a particular sub-entity of the system. The software may be stored in a suitable storage medium, such as a hard disk, a floppy, a memory, an optical disc, etc. The software may be sent as a signal along a wire, or wireless, or using a data network, e.g., the Internet. The software may be made available for download and/or for remote usage on a server. Embodiments of the method may be executed using a bitstream arranged to configure programmable logic, e.g., a field-programmable gate array (FPGA), to perform the method.

It will be appreciated that the invention also extends to computer programs, particularly computer programs on or in a carrier, adapted for putting the invention into practice. The program may be in the form of source code, object code, a code intermediate source, and object code such as partially compiled form, or in any other form suitable for use in the implementation of an embodiment of the method. An embodiment relating to a computer program product comprises computer executable instructions corresponding to each of the processing steps of at least one of the methods set forth. These instructions may be subdivided into subroutines and/or be stored in one or more files that may be linked statically or dynamically. Another embodiment relating to a computer program product comprises computer executable instructions corresponding to each of the means of at least one of the systems and/or products set forth.

Figure 4A:
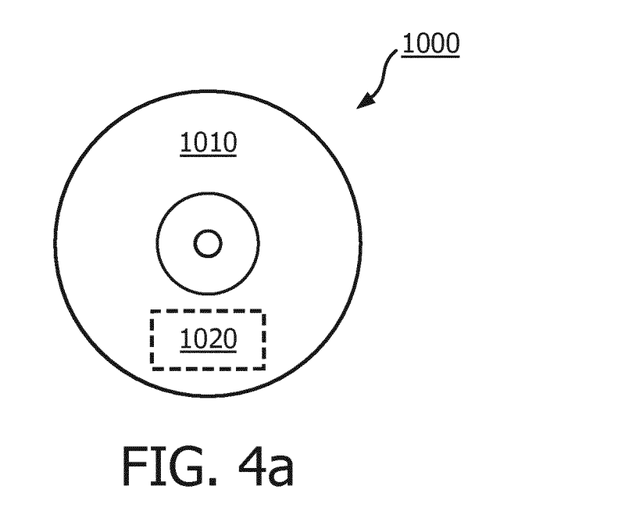

FIG. 4a shows a computer readable medium 1000 having a writable part 1010 comprising a computer program 1020, the computer program 1020 comprising instructions for causing a processor system to perform a computation method according to an embodiment. The computer program 1020 may be embodied on the computer readable medium 1000 as physical marks or by means of magnetization of the computer readable medium 1000. However, any other suitable embodiment is conceivable as well. Furthermore, it will be appreciated that, although the computer readable medium 1000 is shown here as an optical disc, the computer readable medium 1000 may be any suitable computer readable medium, such as a hard disk, solid state memory, flash memory, etc., and may be non-recordable or recordable. The computer program 1020 comprises instructions for causing a processor system to perform said computation method.

Figure 4B:
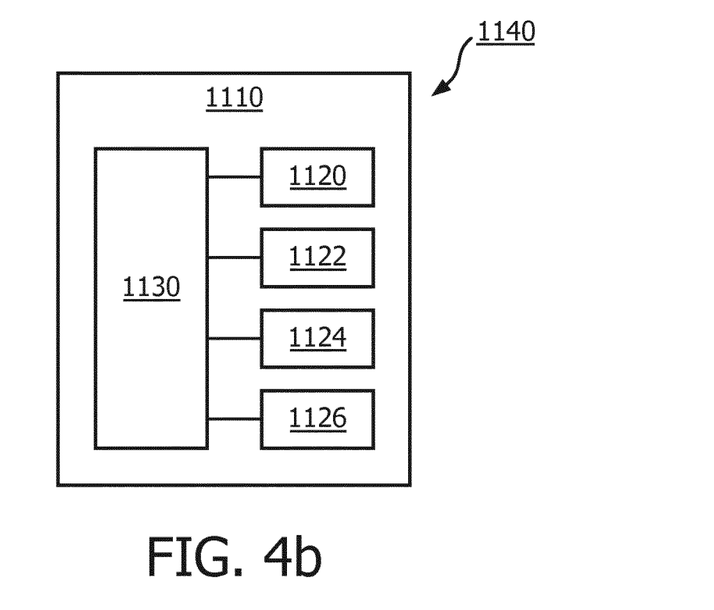

FIG. 4b shows in a schematic representation of a processor system 1140 according to an embodiment of a computation device. The processor system comprises one or more integrated circuits 1110. The architecture of the one or more integrated circuits 1110 is schematically shown in FIG. 4b.

Circuit 1110 comprises a processing unit 1120, e.g., a CPU, for running computer program components to execute a method according to an embodiment and/or implement its modules or units. Circuit 1110 comprises a memory 1122 for storing programming code, data, etc. Part of memory 1122 maybe read-only. Circuit 1110 may comprise a communication element 1126, e.g., an antenna, connectors or both, and the like. Circuit 1110 may comprise a dedicated integrated circuit 1124 for performing part or all of the processing defined in the method. Processor 1120, memory 1122, dedicated IC 1124 and communication element 1126 maybe connected to each other via an interconnect 1130, say a bus. The processor system 1110 may be arranged for contact and/or contact-less communication, using an antenna and/or connectors, respectively.

For example, in an embodiment, processor system 1140, e.g., the computation device may comprise a processor circuit and a memory circuit, the processor being arranged to execute software stored in the memory circuit. For example, a processor circuit may be an Intel Core i7 processor, ARM Cortex-R8, etc. In an embodiment, the processor circuit may be ARM Cortex M0. The memory circuit may be an ROM circuit, or a non-volatile memory, e.g., a flash memory. The memory circuit may be a volatile memory, e.g., an SRAM memory. In the latter case, the device may comprise a non-volatile software interface, e.g., a hard drive, a network interface, etc., arranged for providing the software.

It should be noted that the above-mentioned embodiments illustrate rather than limit the invention, and that those skilled in the art will be able to design many alternative embodiments.

In the claims, any reference signs placed between parentheses shall not be construed as limiting the claim. Use of the verb 'comprise' and its conjugations does not exclude the presence of elements or steps other than those stated in a claim. The article 'a' or 'an' preceding an element does not exclude the presence of a plurality of such elements. The invention may be implemented by means of hardware comprising several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage.

In the claims references in parentheses refer to reference signs in drawings of exemplifying embodiments or to formulas of embodiments, thus increasing the intelligibility of the claim. These references shall not be construed as limiting the claim.

The invention claimed is:

1. A computation device configured for batch-wise multiparty verification and secure cryptographic sharing of a computation comprising a set of variables, the computation being performed multiple times ($a_i b_i = c_i$; $a_{i,1} b_{i,1} + a_{i,2} b_{i,2} = c_i$) wherein the set of variables have multiple sets of values ($a_i$, $b_i$, $c_i$; $a_{i,1}$, $b_{i,1}$, $a_{i,2}$, $b_{i,2}$, $c_i$), the computations being multiparty computations cryptographically shared between the computation device and multiple other computation devices, the computation device having access to at least a share for each of the values in the multiple sets of values ($[a_i]$, $[b_i]$, $[c_i]$; $[a_{i,1}]$, $[b_{i,1}]$, $[a_{i,2}]$, $[b_{i,2}]$, $[c_i]$), the computation device comprising:

a communication interface configured for digital communication with the multiple other computation devices; and a processor configured to:

perform the computation, with the multiple other computation devices, a further time to obtain a randomizing computation ($a_n b_n = c_n$; $a_{n,1} b_{n,1} + a_{n,2} b_{n,2} = c_n$) on a randomizing set of values, wherein performing the computation comprises randomly selecting at least one of the values in the randomizing set of values by the computation device and the multiple other computation devices, the computation device thus obtaining shares for the randomizing set of values, generate, with the multiple other computation devices, a random number (s), open the random number (s);

after opening the random number (s), for each variable in the set of variables, polynomially interpolate the shares for the value of the variable in the multiple computations ($[a_i]$; $[b_i]$; $[c_i]$) and in the randomizing computation ($[a_n]$; $[b_n]$; $[c_n]$) with respect to a series of base numbers ($\omega_i$) to the random number, thus obtaining a share of a polynomially interpolated value ($[A(s)]$; $[B(s)]$; $[C(s)]$), wherein the processor is configured to verify if the random number (s) is included in the series of base numbers ($\omega_i$) or is zero, and if so to repeat generation of the random number; and receive a further share of the polynomially interpolated values from one or more of the multiple other computation devices, compute the corresponding polynomially interpolated values (A(s), B(s), C(s)) and verify the computation therefor (A(s)B(s)=C(s)).

2. A computation device as in claim 1, wherein the processor is configured to perform a multiparty computation protocol to compute at least one of the values ($c_i$) in a set of values in the multiple computations thus obtaining a share ($[c_i]$) of the value.

3. A computation device as in claim 2, wherein the computation comprises a multiplication, the processor being configured to compute a share ($[z]$) of a product (z) of a first and second multiplicand values (x,y) from multiple shares ($[z_1]_i$, $[z_2]_i$, ...) of multiple products of shares of the first and second multiplicand values ($z_1 = [x]_1 [y]_1$, $z_2 = [x]_2 [y]_2$, ...), said multiple shares ($[z_1]_i$, $[z_2]_i$, ...) of multiple products being received from the multiple other computation devices and/or computed from shares ($[x]$, $[y]$) of the first and second multiplicand values.

4. A computation device as in claim 1, wherein generating the random number (s) comprises generating one or more shares ($[r_{1,2}]$, $[r_{1,3}]$) of one or more random numbers ($r_{1,2}$, $r_{1,3}$) with one or more computation devices of the multiple other computation devices and/or receiving one or more shares ($[r_{2,3}]$) of a random number generated by a subset of the multiple other computation devices, compute the random number (s) from the shares.

5. A computation device as in claim 4, wherein the random number (s) is recomputed from a different set of shares, the processor being configured to verify that the computed and recomputed random number (s) are equal.

6. A computation device as in claim 1, wherein the processor is configured to generate with the multiple other computation devices multiple random numbers ($s_i$), the computation being performed multiple times to obtain multiple randomizing computations, the variables being polynomially interpolated to the multiple random numbers from the shares in the multiple computations and in the multiple randomizing computations.

7. A computation device as in claim 1, wherein at least one of the values in the randomizing computation are randomly generated by the computation device and the multiple other computation devices, and the remaining values are computed from the randomly generated values according to a multiparty computation protocol.

8. A computation device as in claim 1, wherein the processor is configured to generate interpolated computations by
polynomially interpolating the shares for a subset of the variables in the multiple computations ($[a_i]$, $[b_i]$) and in the randomizing computation ($[a_n]$, $[b_n]$) thus obtaining interpolated shares for a subset of the variables in the multiple computations ($[a_{n+1}]$, $[b_{n+1}]$, . . . )
performing a multiparty computation on the interpolated shares to obtain interpolated shares for all variables ($[c_{n+1}]$, . . . ).

9. A computation device as in claim 1, wherein the computation device is configured to verify a first batch of multiple computations and a second batch of multiple computations, wherein a random number (s) used in the verification of the first and second batch of multiple computations is the same and is generated once.

10. A computation device as in claim 1, wherein the processor is configured to open a value (x) in a computation, the processor being configured to
receive a share ($[x]_2$) of the value (x) and of a first message authentication code ($[\alpha x+\beta]$) over the value (x) from a first other computation device ($P_2$) of the multiple other computation devices, and
receive a share ($[x]_3$) of the value (x) and a second message authentication code ($[\gamma x+\delta]$) over the value (x) from a second other computation device ($P_3$) of the multiple other computation devices,
verify the received first and second message authentication codes and compute the value (x) from the share ($[x]_2$, $[x]_3$) of the value (x) corresponding to a valid message authentication code.

11. A computation device as in claim 10, wherein a key (($\alpha,\beta$)) of the first message authentication codes is known to the computation device and the second other device, and a key (($\gamma,\delta$)) of the second message authentication codes is known to the computation device and the first other device.

12. A computation device as in claim 10, wherein the first and second message authentication codes are information theoretic message authentication codes.

13. A computation device as in claim 1, wherein the multiple computations are inner products cryptographically shared between the computation device and multiple other computation devices.

14. A computation method for batch-wise multiparty verification and secure cryptographic sharing of a computation comprising a set of variables implemented by a cryptographic computation device, the computation having been performed multiple times ($a_i b_i = c_i$; $a_{i,1} b_{i,1} + a_{i,2} b_{i,2} = c_i$) wherein the set of variables have multiple sets of values ($a_i, b_i, c_i$; $a_{i,1}, b_{i,1}, a_{i,2}, b_{i,2}, c_i$), the computations being multiparty computations that are cryptographically shared between the cryptographic computation device and multiple other computation devices, the computation method:
providing digital communication with the multiple other computation devices;
storing a share for each of the values in the multiple sets of values ($[a_i]$, $[b_i]$, $[c_i]$; $[a_{i,1}]$, $[b_{i,1}]$, $[a_{i,2}]$, $[b_{i,2}]$, $[c_i]$);
performing the computation, with the multiple other computation devices, a further time to obtain a randomizing computation ($a_n b_n = c_n$; $a_{n,1} b_{n,1} + a_{n,2} b_{n,2} = c_n$) on a randomizing set of values;
randomly selecting at least one of the values in the randomizing set of values using the cryptographic computation device and the multiple other computation devices, the cryptographic computation device thereby obtaining shares for the randomizing set of values;
generating with the multiple other computation devices a random number (s);
opening the random number (s);
after opening the random number (s), for each variable in the set of variables, polynomially interpolating the shares for the value of the variable in the multiple computations ($[a_i]$; $[b_i]$; $[c_i]$) and in the randomizing computation ($[a_n]$; $[b_n]$; $[c_n]$) with respect to a series of base numbers ($\omega_i$) to the random number, thus obtaining a share of a polynomially interpolated value ($[A(s)]$; $[B(s)]$; $[C(s)]$), and further verifying if the random number (s) is included in the series of base numbers ($\omega_i$) or is zero, and if so to repeat generation of the random number; and
receiving a further share of the polynomially interpolated values from one or more of the multiple other computation devices, computing the corresponding polynomially interpolated values (A(s), B(s), C(s)) and verifying the computation therefor (A(s)B(s)=C(s)).

15. A non-transitory computer program product comprising program code stored on a computer readable medium comprising instructions to perform the method according to claim 14 when executed on a computer.

* * * * *